US007450342B2

(12) United States Patent
White et al.

(10) Patent No.: US 7,450,342 B2
(45) Date of Patent: Nov. 11, 2008

(54) COMPOSITE HEAD-ELECTRICAL CONDITIONER ASSEMBLY

(75) Inventors: Andrew David White, Brooklyn Park, MN (US); Roger Lee Hipwell, Jr., Eden Prairie, MN (US); John R. Pendray, Edina, MN (US); Bradley Jay VerMeer, Savage, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 453 days.

(21) Appl. No.: 11/079,052

(22) Filed: Mar. 14, 2005

(65) Prior Publication Data
US 2006/0203387 A1   Sep. 14, 2006

(51) Int. Cl.
G11B 5/48 (2006.01)
G11B 5/60 (2006.01)

(52) U.S. Cl. ............... 360/234.5; 360/234.4; 360/245.9

(58) Field of Classification Search ............ 360/234.5, 360/234.4, 244.1, 245.8, 245.9, 246
See application file for complete search history.

(56) References Cited

U.S. PATENT DOCUMENTS

| | | | | |
|---|---|---|---|---|
| 4,809,103 | A | 2/1989 | Lazzari | 360/103 |
| 5,587,857 | A | 12/1996 | Voldman et al. | 360/103 |
| 5,644,452 | A | 7/1997 | Cox et al. | 360/106 |
| 5,712,747 | A | 1/1998 | Voldman et al. | 360/103 |
| 6,239,947 | B1 * | 5/2001 | Fan et al. | 360/245.9 |
| 6,339,519 | B1 * | 1/2002 | Nomura et al. | 360/244.1 |
| 6,351,353 | B1 * | 2/2002 | Sluzewski et al. | 360/294.3 |
| 6,400,529 | B1 * | 6/2002 | Baba et al. | 360/234.4 |
| 6,404,575 | B1 | 6/2002 | Yen | 360/46 |
| 6,603,623 | B1 | 8/2003 | Fontana, Jr. et al. | 360/68 |
| 6,687,066 | B1 | 2/2004 | Nguyen | 360/46 |
| 6,728,071 | B2 * | 4/2004 | Shimizu | 360/244.1 |
| 6,822,817 | B2 | 11/2004 | Chung et al. | 360/46 |
| 6,826,016 | B2 * | 11/2004 | Katsumata | 360/245.9 |
| 6,927,946 | B2 * | 8/2005 | Shum et al. | 360/294.3 |
| 6,930,860 | B1 * | 8/2005 | Coffey | 360/294.4 |
| 6,956,722 | B2 * | 10/2005 | Wada et al. | 360/245.8 |
| 7,095,594 | B2 * | 8/2006 | Maimone et al. | 360/244.1 |
| 7,116,523 | B2 * | 10/2006 | Lee et al. | 360/245.9 |
| 7,130,155 | B2 * | 10/2006 | Katsumata | 360/244.1 |
| 7,161,765 | B2 * | 1/2007 | Ichikawa et al. | 360/234.5 |
| 2002/0057531 | A1 | 5/2002 | Segar et al. | 360/234.5 |
| 2002/0097517 | A1 | 7/2002 | Bonin et al. | 360/75 |
| 2002/0118483 | A1 | 8/2002 | Meyer et al. | 360/75 |
| 2002/0135940 | A1 * | 9/2002 | Ichikawa et al. | 360/234.5 |
| 2002/0171981 | A1 * | 11/2002 | Wada et al. | 360/244.1 |
| 2003/0002219 | A1 * | 1/2003 | Watanabe | 360/244.1 |
| 2003/0043491 | A1 | 3/2003 | Riddering et al. | 360/69 |

(Continued)

*Primary Examiner*—Jefferson Evans
(74) *Attorney, Agent, or Firm*—Westman, Champlin & Kelly, P.A.

(57) ABSTRACT

A composite head-electrical conditioner assembly that includes a slider with a transducer head and transducer bond pads. The transducer bond pads communicate a transducer level electrical signal with the transducer head. An integrated circuit substrate has a conditioning circuit and first substrate bond pads electrically connected to the transducer bond pads. The integrated circuit substrate has second substrate bond pads with a conditioned electrical signal that is transmittable over a circuit. The slider is rigidly mounted to the integrated circuit substrate to form an assembly that is flexibly mountable. A thermal isolation space is provided between the transducer and the conditioning circuit. The integrated circuit can be in the form of a cap that provides windage reduction.

18 Claims, 9 Drawing Sheets

U.S. PATENT DOCUMENTS

| | | | |
|---|---|---|---|
| 2003/0148715 A1 | 8/2003 | Boutaghou | 451/41 |
| 2004/0007076 A1 | 1/2004 | Riddering et al. | 73/766 |
| 2004/0022169 A1* | 2/2004 | Ichikawa et al. | 369/244 |
| 2004/0051992 A1 | 3/2004 | Boutaghou et al. | 360/75 |
| 2004/0080861 A1 | 4/2004 | Bonin et al. | 360/78.05 |
| 2004/0109253 A1 | 6/2004 | Nishiyama et al. | 360/46 |
| 2004/0207956 A1* | 10/2004 | Maimone et al. | 360/234.5 |
| 2004/0233568 A1 | 11/2004 | Ram et al. | 360/75 |
| 2004/0264065 A1 | 12/2004 | Ionescu et al. | 360/323 |
| 2005/0013051 A1* | 1/2005 | Katsumata | 360/244.1 |

* cited by examiner

COMPOSITE HEAD-ELECTRICAL CONDITIONER ASSEMBLY

FIELD OF THE INVENTION

The present invention relates generally to mechanical suspension and electrical interconnection of high data rate transducers in data storage devices, and more particularly, but not by limitation, to mechanical suspension and electrical interconnection of read/write heads in disc drives.

BACKGROUND OF THE INVENTION

In disc drives, one or more sliders are provided that support read/write heads that fly over a moving disc storage surface. Each slider includes an air bearing surface that faces a moving disc surface and that interacts aerodynamically with a moving layer of air adjacent the moving disc surface. The aerodynamic interaction generates a force on the slider. The slider is suspended from a load beam that exerts a suspension load force on the slider. The air bearing surface is shaped such that the aerodynamic force and the suspension load force are in a delicate balance that controls a fly height for the slider in a narrow range needed for optimum read/write performance. If this delicate balance is upset, the slider may crash into the moving disc storage surface. The slider is also highly miniaturized to have a low mass so that it adjust fly height rapidly in response to changes in the aerodynamic force so that the slider does not crash into the moving disc surface.

Electrical interconnections between the read/write head and read/write conditioning circuitry are made by way of flexible circuits so that mechanical forces from the interconnections are low and do not upset the delicate balance of forces on the low mass slider.

In some cases, conditioning circuitry for the read/write head is supported at a location that is remote from the slider and read/write head. The mass of conditioning circuit integrated circuit package is mechanically decoupled from the slider and does not add a large suspended mass and slow down the mechanical response of the slider to changing aerodynamic forces. Integrated conditioning circuitry is typically mounted on a circuit board, or in some cases in an integrated circuit package on a portion of the flexible interconnect circuit. The mass of the conditioning circuitry is large relative to the mass of the slider. The mass of the conditioning circuitry is mechanically decoupled from the mass of the slider and read/write head.

In other cases, actively powered conditioning circuitry is fabricated as part of the same substrate that includes the head. In this arrangement, there is a problem with power dissipated in the conditioning circuitry heating the substrate and overheating the head. In this arrangement integrated circuit processing can be highly complex when optimal performance of the head requires one crystallographic orientation of the substrate, and optimal performance of the conditioning circuitry requires a different crystallographic orientation of the substrate. Processing technology for forming the head can be markedly different that processing technology for the conditioning circuitry, leading to a large number of steps needed to fully fabricate a substrate with both a head and a conditioning circuit.

The read/write data rates of data storage devices, however, are increasing. On the one hand, the power consumption for heads is decreasing in newer designs of data storage devices. On the other hand, conditioning circuitry for newer design heads is becoming more complex and dissipating more power. In newer designs, the heads transduce lower power, higher frequency electrical signals that are excessively loaded by the flexible electrical interconnections that extend between the read/write heads and the conditioning integrated circuitry. The electrical loading degrades the read/write signals, causes impedance matching and reflection problems, and reduces noise margins. The flexible circuit interconnection between the read/write head and the conditioning circuitry sets an undesirable limit on the read/write data speeds in new disc drive designs.

There is a desire to move conditioning circuitry close to the head, however, power consumption and complex process technologies make placement of conditioning circuitry directly on the head increasingly impractical.

A method and an apparatus are needed to overcome the problem of electrical loading of interconnect circuitry between read/write heads and conditioning circuitry without unduly degrading the mechanical responsiveness of the low mass mechanical suspension of the slider and without overheating the head with heat from the conditioning circuitry. Embodiments of the present invention provide solutions to these and other problems, and offer other advantages over the prior art.

SUMMARY OF THE INVENTION

Disclosed is a composite head-electrical conditioner assembly. The composite head-electrical conditioner assembly comprises a slider with a transducer head and transducer bond pads. The transducer bond pads communicate a transducer level electrical signal with the transducer head.

The composite head-electrical conditioner assembly comprises an integrated circuit substrate having a conditioning circuit and first substrate bond pads electrically connected to the transducer bond pads. The integrated circuit substrate has second substrate bond pads with a conditioned electrical signal that is transmittable over a circuit. The slider is rigidly mounted to the integrated circuit substrate to form an assembly that is flexibly mountable.

A thermal isolation space is provided between the transducer head and the conditioning circuit.

Other features and benefits that characterize embodiments of the present invention will be apparent upon reading the following detailed description and review of the associated drawings.

DETAILED DESCRIPTION OF ILLUSTRATIVE EMBODIMENTS

In embodiments described below, a conditioning integrated circuit is rigidly attached to a slider that has a data transducer. The conditioning integrated circuit has a low mass because the conditioning integrated circuit does not include a conventional integrated circuit leadframe and package. Bond pads on the integrated circuit connect directly to transducer bond pads without any flexible circuit intervening between the integrated circuit bond pads and the transducer bond pads. Direct connections can be made with solder bumps or other direct connection methods. The direct connection avoids electrical loading of transducer level signals. The conditioning circuit conditions transducer level signals and provides conditioned electrical signals to the flexible circuit. A thermal isolation space is provided between the transducer head and the conditioning circuit. The resulting composite head-electrical conditioner assembly has a low suspended mass and facilitates high speed data transfer with the transducer without loading transducer level electrical signals. In one preferred embodiment, the conditioning integrated circuit is aerodynamically shaped to reduce undesired fluctuation in head position due to windage.

Figure 1:
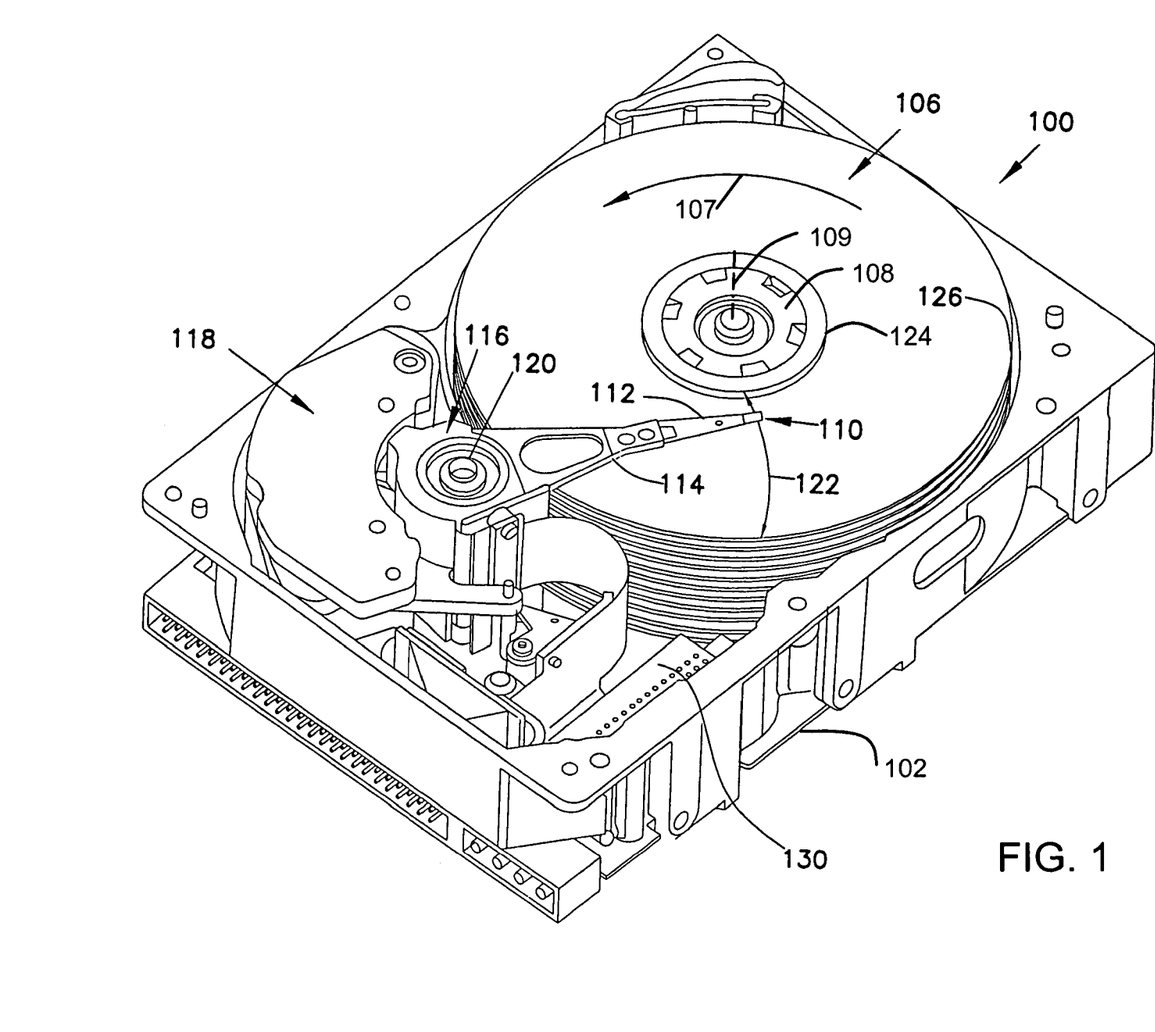
FIG. 1 is an isometric view of a disc drive.

FIG. 1 is an isometric view of a disc drive 100 in which embodiments of the present invention are useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109 in a direction indicated by arrow 107. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

Figure 2:
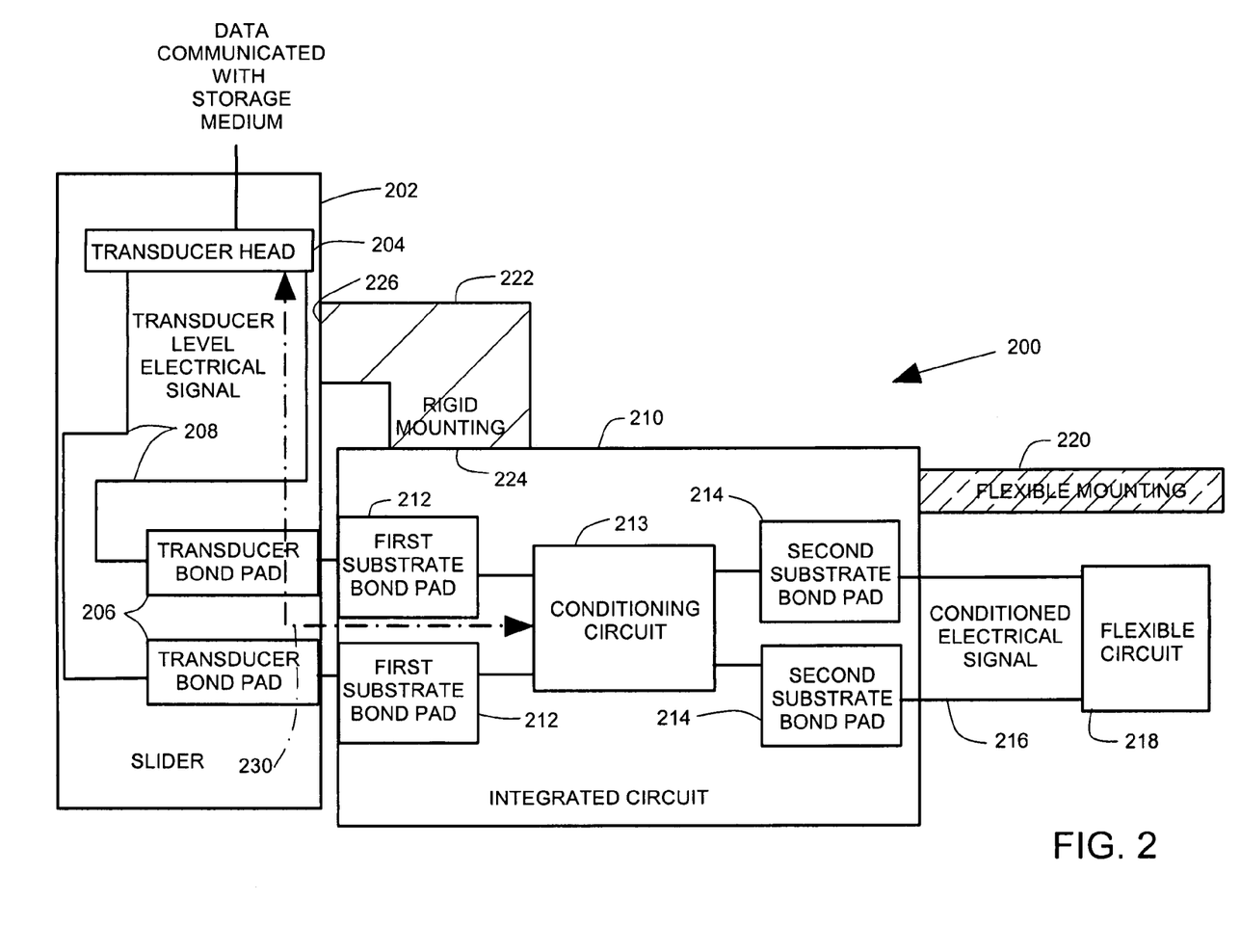
FIG. 2 illustrates a block diagram of a first embodiment of a composite head-electrical conditioner assembly.

FIG. 2 illustrates a block diagram of a first embodiment of a composite head-electrical conditioner assembly 200. The composite head-electrical conditioner assembly 200 comprises a slider 202 with a transducer head 204 and multiple transducer bond pads 206. The transducer bond pads 206 communicate a transducer level electrical signal 208.

The composite head-electrical conditioner assembly 200 comprises an integrated circuit substrate 210. The integrated circuit substrate 210 comprises first substrate bond pads 212 that electrically connect to the transducer bond pads 206. The connections between first substrate bond pads 212 and transducer bond pads 206 is direct or extending over a very small distance such that there is essentially no degradation of the transducer level electrical signal 208 due to the connections.

The integrated circuit substrate 210 has second substrate bond pads 214 that communicate a conditioned electrical signal 216. The conditioned electrical signal 216 is conditioned by a conditioner circuit 213 such that transmission over a flexible circuit 218 does not degrade or load either the conditioned electrical signal 216 or the transducer level electrical signal 208. The conditioned electrical signal 216 has either a higher signal level or lower impedance level in comparison with the signal level and impedance level present in the transducer level electrical signal 208.

The conditioner circuit 213 is spaced apart from the transducer head 204 by a thermal isolation space 230. The thermal isolation space 230 provides thermal resistance between the conditioner circuit 213 and the transducer head 204 such that the heat generated in the conditioner circuit 213 does not overheat the transducer head 204. The conditioner circuit 213 is an active device which is supplied with power from an external power source and which dissipates a significant amount of electrical power in controlling currents or voltages. The thermal resistance can be establishing by any combination of narrowing or lengthening thermal flow paths through solids, or by providing air flow spaces around the conditioning circuit 213 or around the thermal flow paths. A thermal isolation space 230 to prevent overheating of the transducer head can be optimized using computer modeling, in situ testing, or a combination of computer modeling and in-situ testing. Examples of thermal isolation spaces are described below in connection with FIGS. 3, 8.

The slider 202 is rigidly mounted by a rigid mount 222 to the integrated circuit substrate 210 to form an assembly that is flexibly mountable by flexible mounting 220. The rigid mount 222 can comprise, for example, solder, epoxy, adhesive, or other types of rigid bonds known to those skilled in the art. The flexible mounting 220 is typically a gimbal mount. The flexible mounting can couple to the integrated circuit substrate 210 as illustrated in FIG. 2, or can alternatively couple to the slider 202.

In one preferred arrangement, the transducer bond pads 206 are directly bonded to the first substrate bond pads 212, and the direct bond also serves as the rigid mount 222 between the slider 202 and the integrated circuit substrate 210.

In another preferred arrangement, an integrated circuit substrate surface 224 is rigidly mounted to a slider surface 226, placing the transducer bond pads 206 in close proximity to the first substrate bond pads 212. In this arrangement, solder bumps can be used to complete electrical connections.

Figure 3:
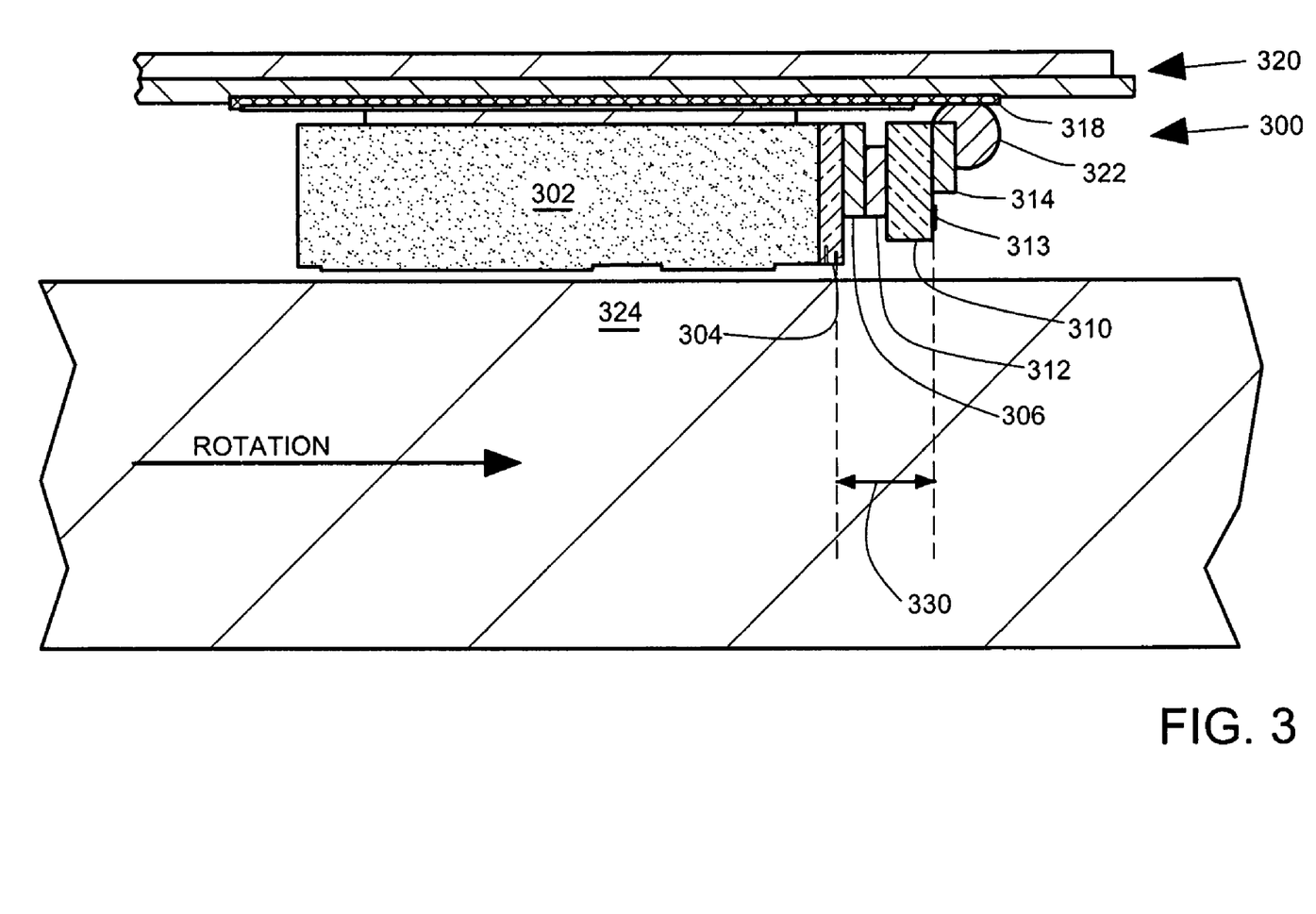
FIG. 3 illustrates a side view of a second embodiment of a composite head-electrical conditioner assembly.

FIG. 3 illustrates a cross-sectional side view of a second embodiment of a composite head-electrical conditioner assembly 300. The composite head-electrical conditioner assembly 300 comprises a slider 302 with a transducer head 304 and multiple transducer bond pads 306, only one of which is visible in FIG. 3. The transducer bond pads 306 communicate a transducer level electrical signal from the transducer head 304.

The composite head-electrical conditioner assembly 300 comprises an integrated circuit substrate 310. The integrated circuit substrate 310 comprises first substrate bond pads 312 that electrically connect to the transducer bond pads 306. The connections between first substrate bond pads 312 and transducer bond pads 306 is direct, as illustrated, and extends over a very small distance such that there is essentially no degradation of the transducer level electrical signal due to the connections between bond pads 306, 312. The integrated circuit substrate 310 is free of a lead frame and a molded integrated circuit package, and is typically a processed chiplet of silicon with conditioning circuit 313, bond pads and interconnections on the surface of the silicon to provide a low mass component.

Figure 4:
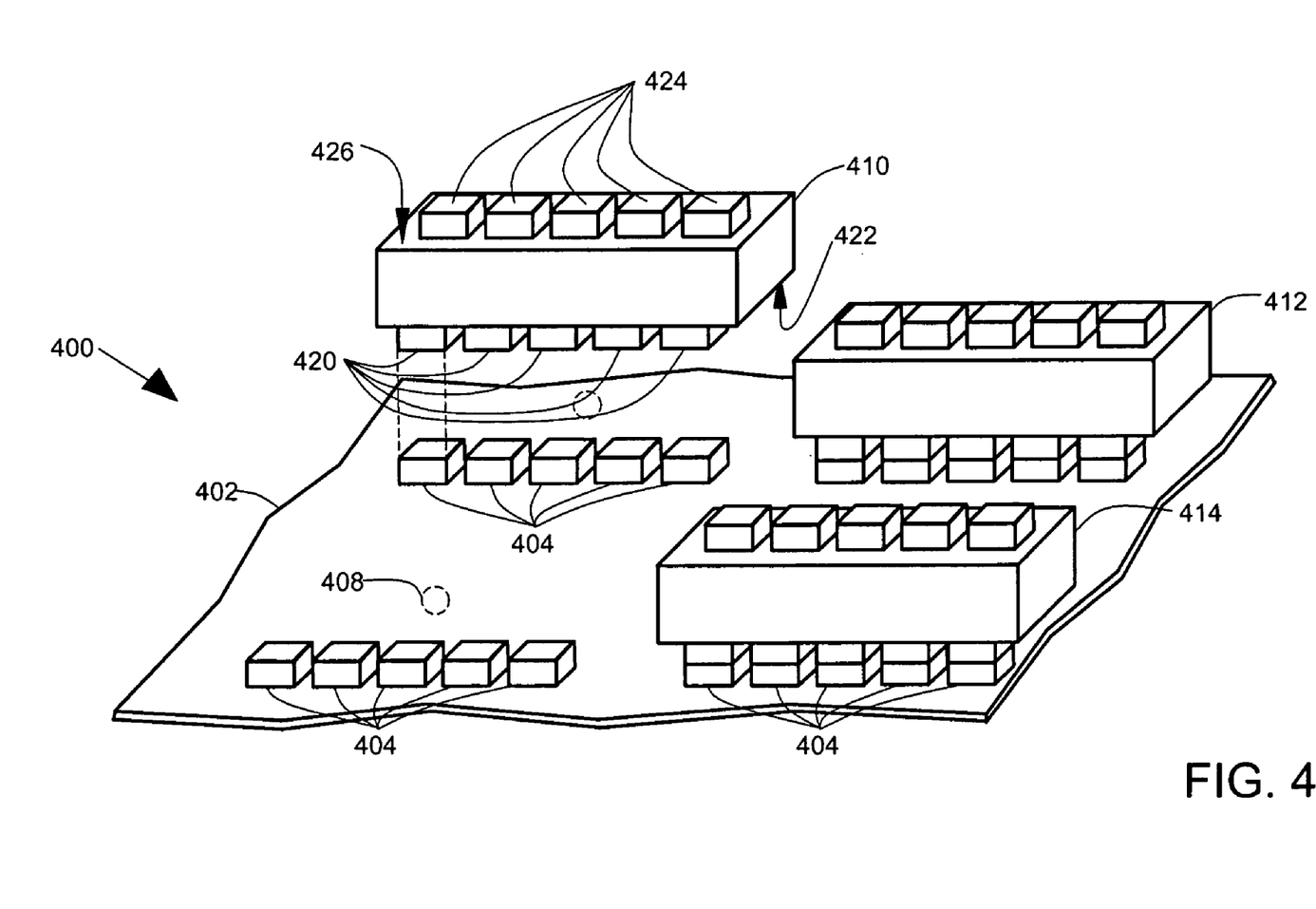
FIG. 4 illustrates a first method of bonding contact pads of chiplets to slider contact pads.

A thermal isolation space 330 is provided between the conditioning circuit 313 and the transducer head 304. There is a thermal flow path (from the conditioning circuit 313 to the transducer head 304) through solids such as the integrated circuit substrate 310, the bond pads 306, 312, and the substrate that includes the transducer head 304. As better illustrated in FIG. 4, the bond pads (404, 420 in FIG. 4 comparable to bond pads 306, 312 in FIG. 3) have lengths that separate the substrates from one another. The bond pads 404, 420 have extended lengths that increase thermal resistance. The bond pads have cross sections that are narrowed to less than the cross sections of the substrates to increase thermal resistance. There are also air spaces around the bond pad 404, 420 through which air can flow to carry away heat. In FIG. 4, the transducer head is at a location 408 that is spaced away from its associated bond pads 404 which provides additional thermal resistance.

The integrated circuit substrate 310 can include a read amplifier as part of conditioning circuit 313 that receives a transducer level read signal from the transducer head 304 and provides an amplified read signal at second substrate bond pads 314. In preferred embodiments, the integrated circuit substrate 310 further includes at least a second conditioning circuit conditioning a transducer level signal. The second conditioning circuit can be a write buffer amplifier, a contact detection amplifier, an accelerometer amplifier, a shock sensor amplifier, a read current source, a microactuator amplifier or other circuits that are interconnected with transducer circuitry mounted on the slider 302.

The integrated circuit substrate 310 has the second substrate bond pads 314 for communicating a conditioned electrical signal. The conditioned electrical signal is conditioned by the conditioner circuit 313 such that transmission over a flexible circuit 318 does not degrade or load either the conditioned electrical signal or the transducer level electrical signal. The conditioned electrical signal has either a higher signal level or lower impedance level in comparison with the signal level and impedance level present in the transducer level electrical signal.

The integrated circuit substrate 310 is rigidly mounted to the slider 302 by the bond pads 306, 312 to form a composite head-electrical conditioner assembly 300 that is internally rigid, but flexibly mounted by a flexible gimbal mount 320. Various know gimbal mounts can be used. The transducer bond pads 306 are directly bonded to the first substrate bond pads 312, and the direct bond serves as a rigid mount between the slider 302 and the integrated circuit substrate 310. Solder bumps 322 are used to complete electrical connections between the bond pads 314 and contacts on the flexible circuit 318. In one preferred arrangement, conventional TIC-type electrical connections can be made to the flex circuit. In another preferred arrangement, resistive heater wires can be provided on the chiplet wafer to reflow pre-patterned solder bumps to bond chiplet to transducer bond pads remotely. Bonding methods can also include gold compression bonding, ultrasonic bonding, thermal solder reflow, gold or solder bump dispense (such as TIC), or other electrical connection techniques.

The composite head-electrical conditioner assembly 300 flies over a moving media (such as a disc) 324. The movement of the media 324 produces air flow between the slider 302 and the media 324 such that the slider 302 flies over the moving media 324. Methods of directly connecting bond pads 306 to bond pads 312 are described in more detail below in connection with FIG. 4 and FIG. 5.

FIG. 4 illustrates a first method of manufacturing composite head-electrical conditioner assemblies. A transducer wafer 400 is provided and includes a transducer wafer substrate 402 and multiple transducer bond pads 404 in a defined pattern. Transducer wafer 400 can also include transducers at locations 408 or, alternatively, transducers can be deposited in a later processing step.

A plurality of integrated circuit substrates (also called chiplets) 410, 412, 414 are provides. Each integrated circuit substrate 410, 412, 414 has a pattern of first substrate bond pads 420 on a first substrate face 422, and has second substrate bond pads 424 on a second substrate face 426. The first substrate bond pads 420 are in the same defined pattern as the transducer bond pads 404.

The individual integrated circuit substrates 410, 412, 414 are handled to place the exposed first substrate bond pads 420 in contact with the transducer bond pads 404 such that the contacts match and make mechanical contact. Each first substrate bond pad 420 is then electrically bonded to a corresponding transducer bond pad 404. The electrical bonding provides both a rigid mechanical mounting and an electrical connection. The assembled integrated circuit substrates 410, 412, 414 and transducer wafer 402 can then be handled as a single assembly and subjected to further processing which can include depositing transducers in locations 404 (if not done earlier), dicing the substrate 402 into individual transducer substrates with integrated circuit substrates rigidly attached together, and joining the assemblies to sliders (if not done earlier).

In a preferred arrangement, the integrated circuit substrates 410 have smaller cross sections that do not overlap the location 408 of the underlying transducer heads, leaving the location 408 conveniently exposed for deposition of transducer layers in a subsequent process step. In one preferred arrangement, the transducer wafer 402 is arranged with a transducer head array in a pattern of multiple rows as illustrated. The method illustrated in FIG. 4 can be further automated by use of a releaseably bonded handle wafer as described below in connection with FIG. 5.

Figure 5:
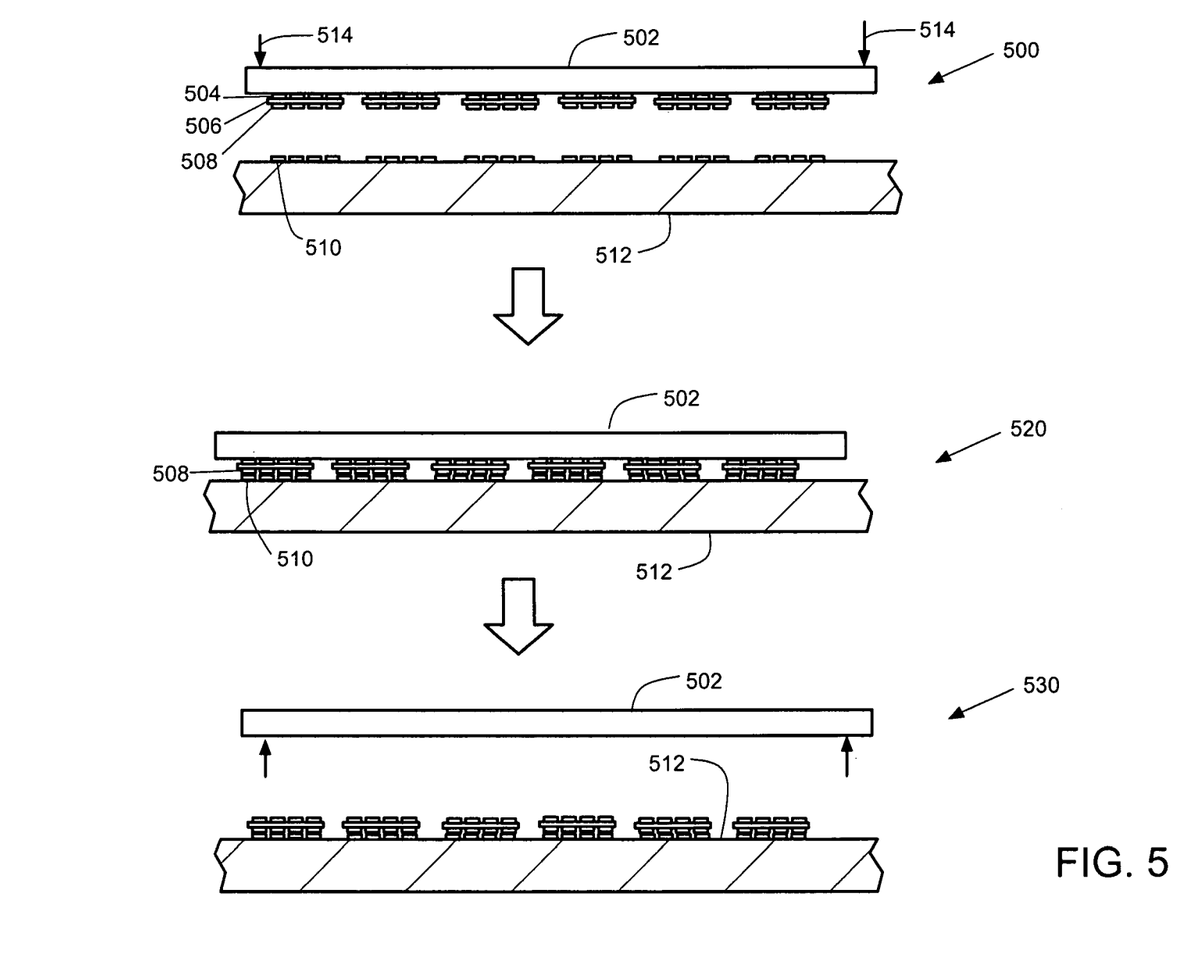
FIG. 5 illustrates a second method of bonding contact pads of chiplets to slider contact pads.

FIG. 5 illustrates a second method of bonding contact pads of chiplets to transducer contact pads. The method illustrated in FIG. 5 is similar to the method illustrated in FIG. 4, however, in FIG. 5 a row or array of multiple chiplets are temporarily joined together by a handle wafer 502 as illustrated at 500. The handle wafer 502 is releaseably bonded to second substrate bond pads 504 on integrated circuit substrates (chiplets) 506. First substrate bond pads 508 are exposed in a defined pattern that corresponds with a pattern of transducer bond pads 510 on a transducer substrate 512. The handle wafer 502 is used as a handle to move the entire row or array of chiplets 506 down as illustrated by arrows 514.

As illustrated at 520, the pattern of first substrate bond pads 508 are aligned with pattern of transducer bond pads 510. Each first substrate bond pad 508 is bonded to an aligned transducer bond pad 510.

As illustrated at 530, the bond between the handle wafer 502 and the second substrate bond pads 504 is released, and the handle wafer 502 is removed. In FIG. 5, a single positioning operation using the handle wafer aligns an entire array of bond pads for many composite head-electrical conditioner assemblies. After removal of the handle wafer, the wafer 512 can be diced to separate individual composite head-electrical conditioner assemblies.

In one preferred arrangement, transducer heads are deposited on the transducer head wafer after the releasing of the bonding of the handle wafer. Transducers can be arranged in a single row or in a pattern of multiple rows. The releasable bonding of the handle wafer preferably comprises a silicon rich Si—Ge film that can be released by hydrogen peroxide etching, or an organic film that can be released by heating.

While FIG. 5 illustrates a handling wafer 502 as a separate, removable component, it will be understood by those skilled in the art that the multiple chiplets 506 can be left together, or in other words integral to a common integrated circuit wafer of chiplets, and the common wafer of chiplets itself can serve as an alternate handle wafer. When the wafer of chiplets is used as a alternate handle wafer, then the wafer of chiplets is diced into separate chiplets after bond pads 508 are aligned and bonded to bond pads 510. When the alternative handle wafer is used, the wafer 512 is also diced after the bond pads 508 are bonded to bond pads 510. In one preferred embodiment, a single row or array of integrated circuit substrates are assembled to a matching transducer wafer or portion of a transducer wafer. The integrated circuit substrate of chiplets are not yet singulated (diced) and are an assembly without the use of a separate handle wafer. The chiplet substrate and the transducer substrate can be diced at the same time, or sequentially.

Figure 6:
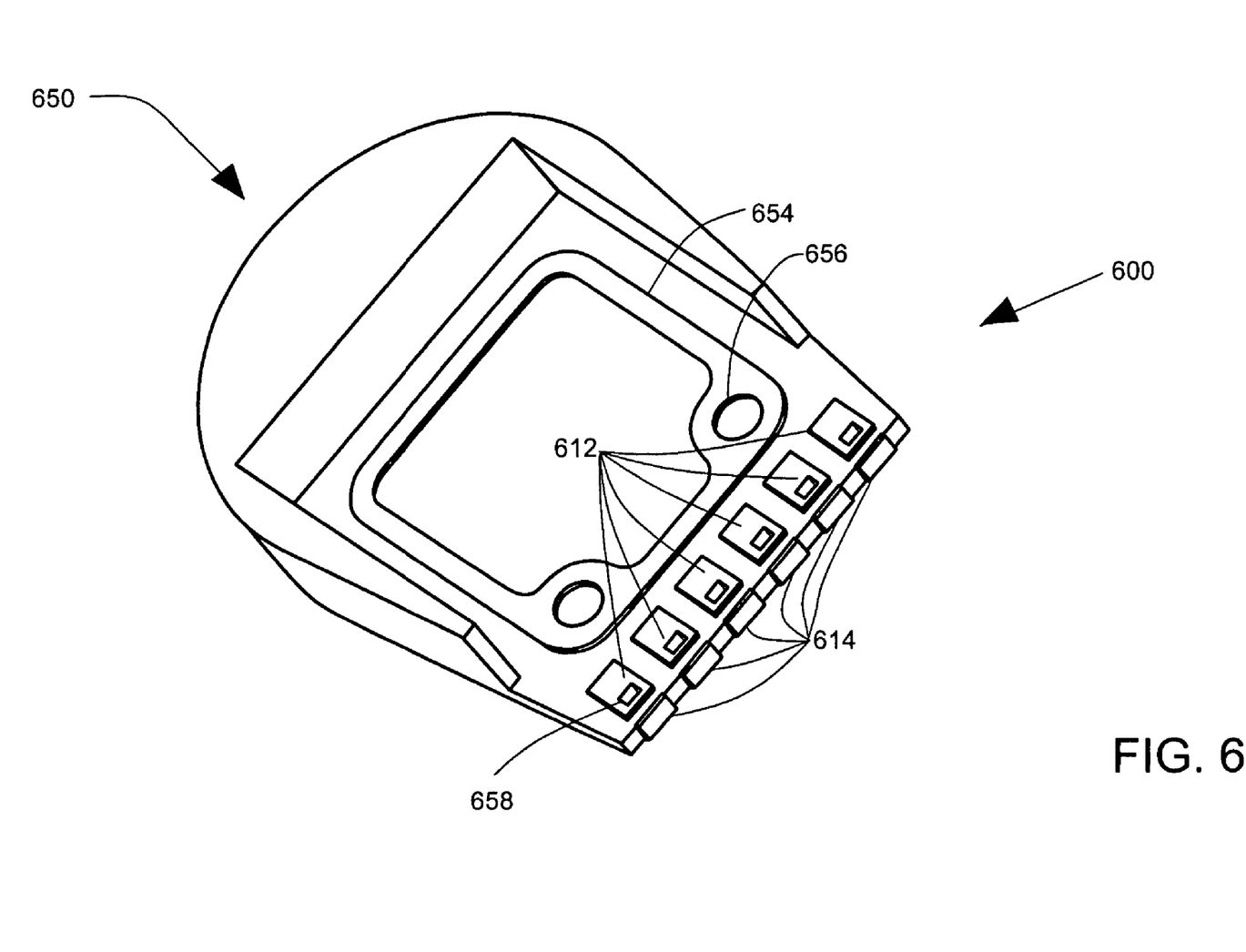
FIG. 6 illustrates an oblique bottom view of an electrical conditioner that includes an aerodynamically shaped leading edge.

FIG. 6 illustrates an oblique bottom view of an electrical conditioner 600 that includes an aerodynamically shaped leading edge 650. The cap-shaped electrical conditioner 600 is batch fabricated from a silicon wafer using standard semiconductor processes. The electrical conditioner 600 includes a cavity or tub structure for receiving a slider. The cap-shaped electrical conditioner 600 has a rounded leading edge 650 for windage runout reduction. The rounded leading edge can reduce windage induced runout by up to 10%.

Figure 7:
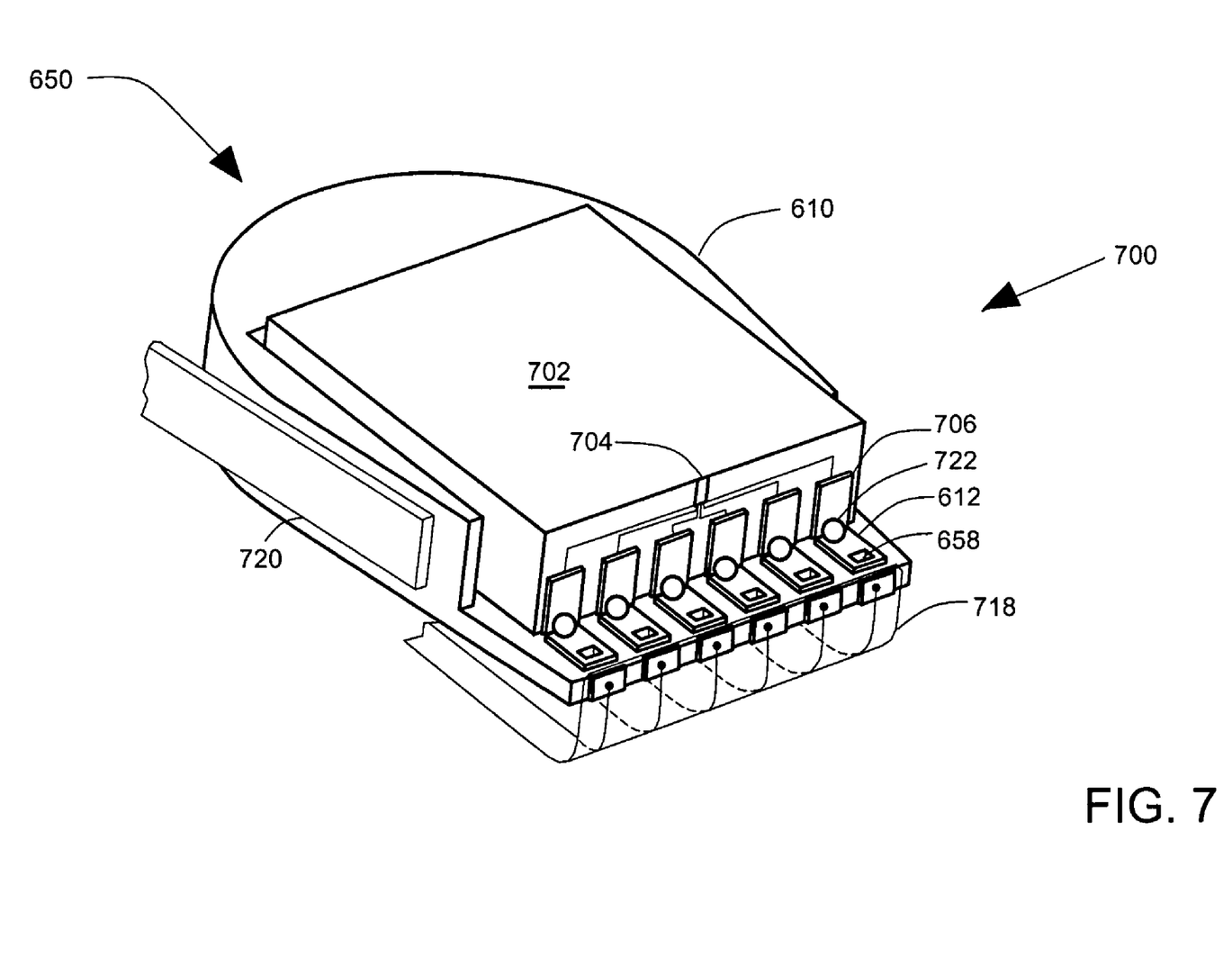
FIG. 7 illustrates an oblique bottom view of a third embodiment of a composite head-electrical conditioner assembly that includes the electrical conditioner of FIG. 6.
Figure 8:
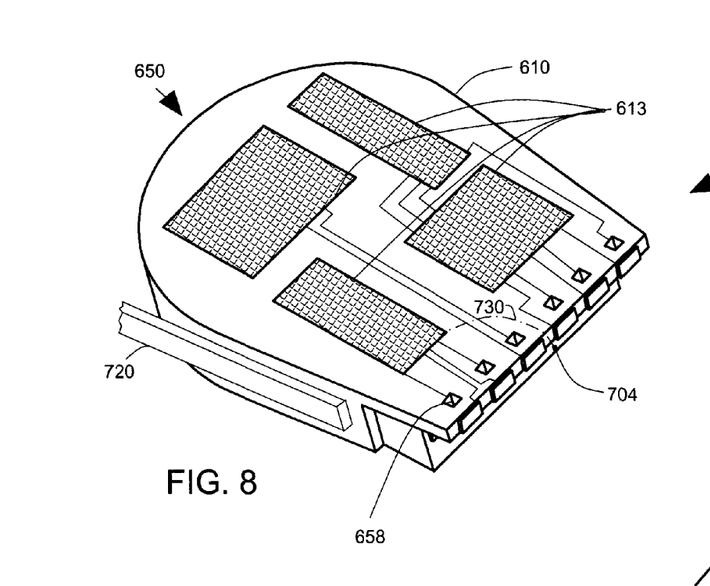
FIG. 8 illustrates a top oblique view of the composite head-electrical conditioner illustrated in FIG. 7.

The electrical conditioner 600 has gold plated bond pads 612, 614. In a preferred embodiment, two fiducial alignment marks 656 in a bonding rim 654 for bonding and alignment with corresponding features of a slider (as illustrated in FIGS. 7-8) can be optionally provided. In one preferred embodiment, the bond pads 612 may include metalized vias 658 for making connections to integrated circuitry on a top side (shown in FIG. 8) of the electrical conditioner 600.

The electrical conditioner 600 can be manufactured through MEMS and standard IC processes. The material can be any substrate that can be used for IC processes. A material like silicon is desired for its low mass. The electrical conditioner 600 can also include other shape features such as gimbal limiters for load/unload positioning and improved shock performance, or microactuator components.

FIG. 7 illustrates an oblique bottom view of a third embodiment of a composite head-electrical conditioner assembly 700 that includes the electrical conditioner 600 of FIG. 6. FIG. 8 illustrates a top oblique view of the composite head-electrical conditioner 700 illustrated in FIG. 7. Referring to both FIG. 7 and FIG. 8, the composite head-electrical conditioner assembly 700 comprises a slider 702 with a transducer head 704 and multiple transducer bond pads 706. The transducer bond pads 706 communicate a transducer level electrical signal from the transducer head 704.

The composite head-electrical conditioner assembly 700 comprises an integrated circuit substrate 610. The integrated circuit substrate 610 comprises first substrate bond pads 612 that electrically connect to the transducer bond pads 706 by solder bumps 722. The connections between first substrate bond pads 612 and transducer bond pads 706 is direct, as illustrated, and extends over a very small distance such that there is essentially no degradation of the transducer level electrical signal due to the connections between bond pads 706, 612.

The integrated circuit substrate 610 has second substrate bond pads 614 that communicate a conditioned electrical signal. The conditioned electrical signal is conditioned by conditioner circuits 613 (FIG. 8) such that transmission over a flexible circuit 718 does not degrade or load either the conditioned electrical signal or the transducer level electrical signal. The conditioned electrical signal has either a higher signal level, a lower impedance level in comparison with the signal level and impedance level present in the transducer level electrical signal, or both.

The slider 702 is rigidly mounted by the bonding rim 654 (FIG. 6) to form the composite head-electrical conditioner assembly 700 that is internally rigid, but flexibly mountable by a flexible gimbal mount 720. Various know gimbal mounts can be used. The transducer bond pads 706 are directly bonded to the first substrate bond pads 612 by solder bumps 722.

Figure 8A:
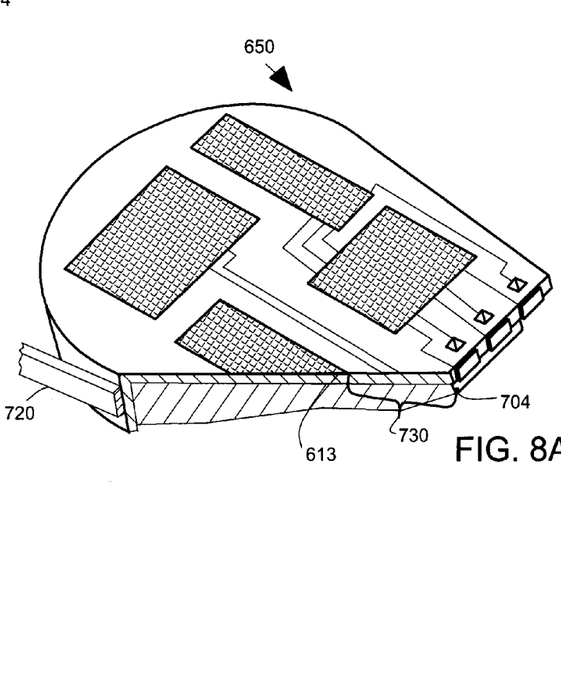
FIG. 8A illustrates the head-electrical conditioner assembly of FIG. 8 with portions broken away.

As illustrated in FIG. 8, there is a thermal isolation space 730 between the transducer head 704 and a nearby edge of one of the conditioning circuits 613. The thermal flow path between the transducer head 704 and the conditioning circuits 613 is relatively long and passes near solid surfaces that are swept by airflow generated by a moving disc over the assembly 700, and possibly a second moving disc over the assembly 700. The arrangement of thermal isolation space 730 prevents significant heat flow from active devices in conditioning circuits 613 to the transducer head 704, and keeps the transducer head 704 from overheating. FIG. 8A illustrates a partially broken away view of the composite head-electrical conditioner of FIG. 8, and illustrates the thermal isolation space 730 along the broken away portion.

In manufacturing the chiplets, a solid (or partially etched chiplet substrate) can be separated after assembly to the transducer wafer using an anisotropic RIE etch (such as Deep Reactive Ion Etching). This could include etching an entire "dice lane" around the chiplets or simply etching small tabs or silicon layers, for example, around holding the chiplets in place. An XeF2 selective gas etch can be used to remove silicon tabs when the rest of the chiplet silicon is protected by a film such as SiO2. This would be a low-temperature, dry release technique.

Figure 9:
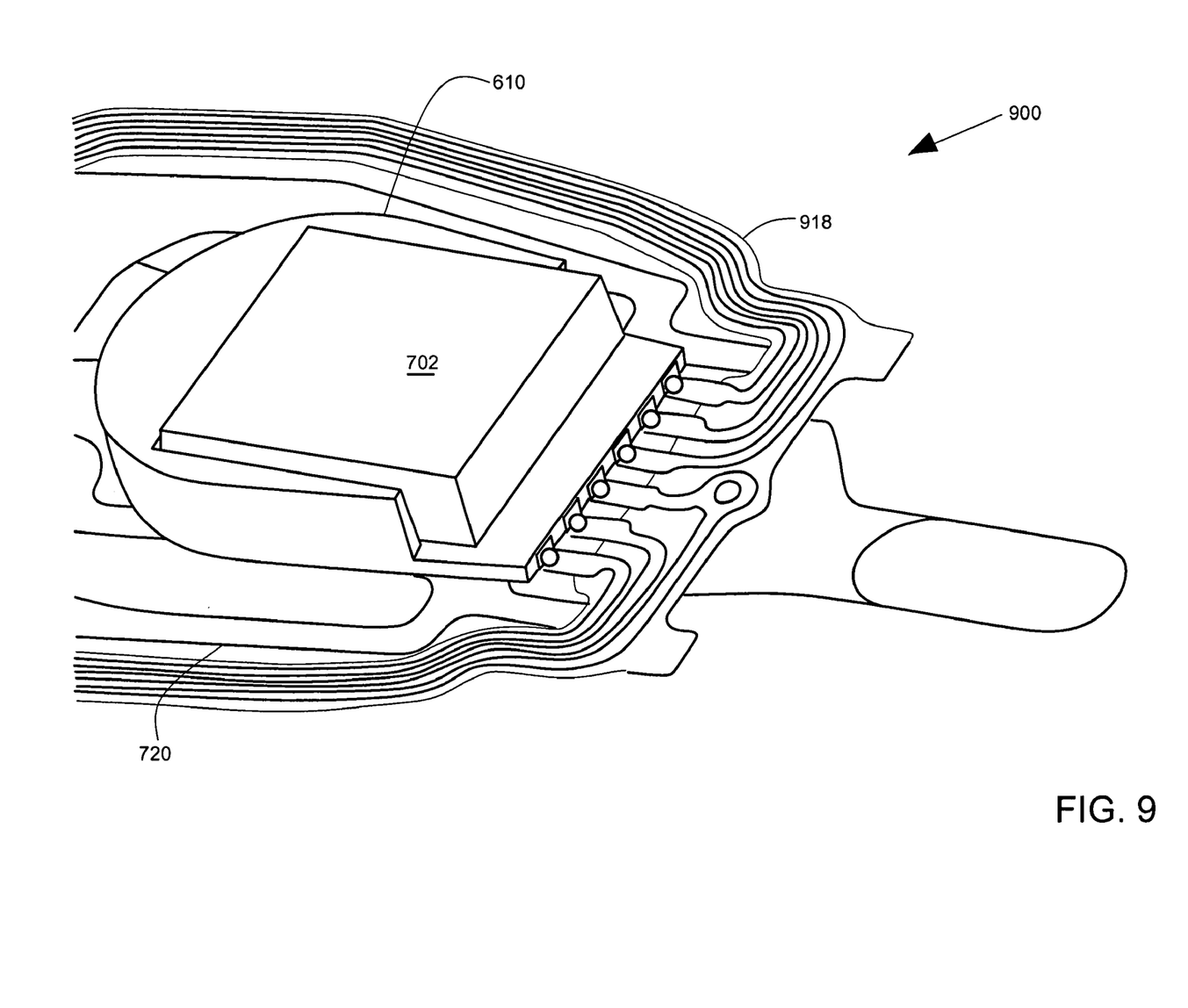
FIG. 9 illustrates a top oblique view of a head conditioner assembly with an alternatively arranged flexible circuit.

FIG. 9 illustrates a top oblique view of a head-conditioner assembly 900 with an alternatively arranged flexible circuit 918. Reference numbers used in FIG. 9 that are the same as reference numbers used in FIG. 7 refer to the same or similar features. Flexible circuit 918 extends around both sides of the head conditioner assembly and is mounted to a head gimbal assembly. In other respects, the head-conditioner assembly 900 is similar to head-conditioner assembly 700 illustrated in FIG. 7.

There is a considerable advantage to the embodiments shown in FIGS. 3, 6-8 in that these embodiments are adaptable for use with a conventional access arm and flexible circuit, with only small dimensional changes to the access arm or flexible circuit. The same production assembly equipment and processes that were used previously to assemble access arms, sliders and flex circuits can be used with the head-electrical conditioner assembly with only minimal changes.

There is also a considerable advantage with the head-electrical conditioner assembly in that the transducer head and the electrical conditioner are placed on two different substrates, allowing optimal crystallographic orientation of each substrate for the differing devices deposited on them.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the suspension and interconnection system while maintaining substantially the same functionality without departing from the scope and spirit of the present invention. In addition, although the preferred embodiment described herein is directed to a read/write head system for a disc drive, it will be appreciated by those skilled in the art that the teachings of the present invention can be applied to other data storage devices, without departing from the scope and spirit of the present invention.

What is claimed is:

1. A composite head-electrical conditioner assembly, comprising:
    a slider with a transducer head and transducer bond pads communicating a transducer level electrical signal,
    an integrated circuit substrate having first substrate bond pads electrically connected to the transducer bond pads, the integrated circuit substrate having a conditioning circuit and second substrate bond pads with a conditioned electrical signal that is transmittable over a circuit; and
    the slider is rigidly mounted to the integrated circuit substrate to provide a thermal isolation space between the transducer head and the conditioning circuit, forming an assembly that is flexibly mountable
    wherein the integrated circuit substrate is rigidly and electrically connected to the slider by positioning at least one solder bump between and in contact with the first substrate bond pads and the transducer bond pads and, wherein the integrated circuit substrate is cap-shaped.

2. The composite head-electrical conditioner assembly of claim 1, further comprising direct bonds between the transducer bond pads and the first substrate bond pads, the direct bonds rigidly attaching the integrated circuit substrate to the slider.

3. The composite head-electrical conditioner assembly of claim 1 wherein the integrated circuit substrate is free of a lead frame and a molded integrated circuit package.

4. The composite head-electrical conditioner assembly of claim 1 wherein the integrated circuit substrate includes a leading edge that is rounded to mitigate windage disturbances from a moving stream of gas flowing around integrated circuit substrate.

5. The composite head-electrical conditioner assembly of claim 1 wherein the conditioning circuit includes a read amplifier that receives a transducer level read signal from the transducer head and provides an amplified read signal at a second substrate bond pad.

6. The composite head-electrical conditioner assembly of claim 5 wherein the conditioning circuit further includes at least a second conditioning circuit conditioning a transducer level signal, the second conditioning circuit being selected from the group of: a write buffer amplifier, a contact detection amplifier, an accelerometer amplifier, a shock sensor amplifier, a read current source, and a microactuator amplifier.

7. The composite head-electrical conditioner assembly of claim 1 wherein the integrated circuit substrate has more than one conditioning circuit.

8. The composite head-electrical conditioner assembly of claim 1 wherein the first substrate bond pads include metallized vias.

9. The composite head-electrical conditioner assembly of claim 1 wherein the integrated circuit substrate is formed of silicon.

10. The composite head-electrical conditioner assembly of claim 1 wherein the integrated circuit substrate comprises a cavity that receives the slider.

11. A data storage device, comprising:
    a media surface;
    an access arm including an end movable adjacent the media surface;
    a composite head-electrical conditioner assembly, flexibly mounted to the movable end, including a slider with a head that transduces data from the media surface to communicate a transducer level signal, and including an integrated circuit rigidly mounted to the slider, the integrated circuit including a conditioning circuit that is separated from the head by a thermal isolation space, the conditioning circuit conditioning the transducer level signal to provide a conditioned electrical signal that is transmittable over a flexible circuit, the integrated circuit including an integrated circuit substrate that is cap-shaped; and
    a flexible circuit mounted to the access arm and carrying the conditioned electrical signal.

12. The data storage device of claim 11 wherein the integrated circuit is free of a lead frame and a molded integrated circuit package.

13. The data storage device of claim 11, further comprising direct bonds between transducer bond pads and first substrate bond pads, the direct bonds rigidly attaching the integrated circuit on the slider.

14. The data storage device of claim 13, wherein a surface of the integrated circuit is rigidly bonded to a surface of the slider, placing the transducer bond pads adjacent corresponding first substrate bond pads, and further comprising solder bumps providing electrical connections between corresponding transducer contact pads and first substrate contact pads.

15. A data storage device comprising:
    a media surface;
    an access arm including an end movable adjacent the media surface;
    a composite head-electrical conditioner assembly, flexibly mounted to the movable end, including a slider with a head that transduces data from the media surface to communicate a transducer level signal to transducer bond pads, and including an integrated circuit that comprises a silicon cap rigidly mounted to the slider, the integrated circuit including first substrate bond pads and a conditioning circuit that is separated from the head by a thermal isolation space, the conditioning circuit conditioning the transducer level signal to provide a conditioned electrical signal that is transmittable over a flexible circuit; and
    a flexible circuit mounted to the access arm and carrying the conditioned electrical signal;
    wherein a surface of the integrated circuit is rigidly bonded to a surface of the slider, placing the transducer bond pads adjacent corresponding first substrate bond pads, and further comprising solder bumps providing electrical connections between corresponding transducer contact pads and first substrate contact pads.

16. The data storage device of claim 11 wherein the flexible circuit connects directly to the integrated circuit.

17. The data storage device of claim 15 wherein the data storage device comprises a disc drive.

18. The data storage device of claim 15 wherein the silicon cap includes a leading edge that is rounded to mitigate windage disturbances from turbulence in a moving stream of gas surrounding the silicon cap.

* * * * *